APPARATUS FOR REPRODUCING IMAGES

Filed March 29, 1956 3 Sheets-Sheet 1

INVENTOR.
WILLIAM C. HUEBNER
BY Hudson, Boughton, Williams, David & Hoffmann
ATTORNEYS INVENTOR.
WILLIAM C. HUEBNER
BY Hudson, Boughton,
Williams, David & Hoffmann
ATTORNEYS June 16, 1959 W. C. HUEBNER 2,890,633
APPARATUS FOR REPRODUCING IMAGES
Filed March 29, 1956 3 Sheets-Sheet 3

INVENTOR.
WILLIAM C. HUEBNER
BY Hudson, Boughton, Williams, David & Hoffmann
ATTORNEYS United States Patent Office 2,890,633

Patented June 16, 1959

2,890,633

APPARATUS FOR REPRODUCING IMAGES

William C. Huebner, Mamaroneck, N.Y., assignor, by mesne assignments, to The Standard Register Company, Dayton, Ohio, a corporation of Ohio Application March 29, 1956, Serial No. 574,787

14 Claims. (Cl. 95—1.7)

This invention relates to apparatus for reproducing images and more particularly to apparatus for the direct reproduction of images by the action of a light sensitive element to precipitate a reproducing material on print receiving material under the influence of an electric field.

The terms "light" or "light rays" as used throughout the specification and claims are referred to as including both visible and invisible light rays above and below the visible spectrum, such as X-rays, ultraviolet, infrared and the like.

Similarly, the term "light image" is used to designate the light rays transmitted through or reflected from, or a combination thereof, image or master copy and passing through the glass plate and conductive coating provided for the light sensitive element or target and focused on the light sensitive or photoconductive layer thereof and having the configuration of the image or master copy.

The terms "image copy" or "master copy" as used herein are intended to include any optically visible subject and may be a film, picture, text, drawing, or surface area; certain portions of which are to represent coated areas on the print receiving material.

The terms "print receiving material" and "untreated print receiving material" are used to define a material which has not been treated to give it special characteristics such as photographic, chemical or mechanical properties to aid in the receiving, developing, fixing or retaining of a reproduced image thereon. The material may be paper, cloth fabrics or other materials which are preferably but not necessarily in sheet or web form.

The term "reproducing material" includes any material capable of receiving an electrical charge or being ionized by any convenient method. The reproducing material may be further characterized as being capable of use in the form of divided and dispersed droplets or globules such as when provided in a cloud-like form.

The term "cloud-like form" is employed with the significance of the definition of "cloud," namely a visible assemblage of solid or liquid particles in the air or in a gas as a cloud of smoke or of dust or of mist or of vapor.

It is therefore an object of the invention to provide an improved apparatus for immediately and directly producing images in final form on print receiving material without contact with the image copy through the derivation of a light image from the image copy and projecting the light image on a light-sensitive target positioned to influence an electric field and thereby control the flow of reproducing material introduced into the electric field for precipitating same on or migrating it to the print receiving material.

It is another object of the invention to provide an improved apparatus for reproducing on print receiving material positioned in an electric field and which field is created between a light-sensitive target and a conductive element and is influenced by light images projected onto the target, the electric field under the influence of the target being effective to precipitate reproducing material onto the print receiving material.

It is a further object of the invention to provide an improved apparatus of the above-mentioned character in which the light-sensitive target is photo-conductive and preferably is mounted between conductive layers with the outer conductive layer and its exposed surface provided with a plurality of minute projections and the conductive element being similarly provided with such projections.

It is still another object of the present invention to provide an improved apparatus for reproducing images utilizing a photo-conductive target in an electric field to control the precipitation of reproducing material onto print receiving material, wherein the reproducing material is isolated from the print receiving material except for printing purposes.

It is still a further object of the invention to provide an improved apparatus for reproducing images wherein light images are derived from image copy and projected onto a light-sensitive target positioned in an electric field to precipitate reproducing material on print receiving material and wherein the reproducing material is continuously isolated from the print receiving material except for a portion of the print receiving material being exposed in a timed relationship with the projection of the light image from the image copy.

It is still a further object of the invention for reproducing images through the utilization of a light-sensitive target in combination with an electric field to control the precipitation of reproducing material in cloud-like form onto print receiving material and where the reproducing material is provided with ionizing means in the nature of short-wave radiant energy. Further and additional objects and advantages will become apparent hereinafter during the detailed description of embodiments of the invention which is to follow and which embodiments are illustrated in the accompanying drawings forming part of this specification, wherein Fig. 1 is a diagrammatic representation illustrating apparatus embodying the invention.

Generally, the invention contemplates directly producing images at high speeds in finished or final form on print receiving material through the utilization of a light-sensitive element as a target for light images derived from the image copy. The light-sensitive target is photoconductive and is spaced from a conductive element connected in circuit relationship therewith to a high voltage source to create an electric field therebetween. The light images projected onto the light-sensitive target are effective to cause a change in the conductivity or resistivity of the target and thereby influence the created electric field in accordance therewith. An image isolator acting as a shutter may be positioned intermediate the light-sentitive target and the conductive element. The reproducing material is introduced into the electric field adjacent the light-sensitive target or when the image isolator is employed intermediate the isolator and the target. The print receiving material is advanced through the electric field adjacent the conductive element in a time relationship with the advancement of the image copy. The projection of the light images and the creation of the electric field are also controlled in a time relationship with the advancement of the image copy and print receiving material. The image isolator is further controlled to expose the print receiving material momentarily during the existence of the light image and electric field to allow the reproducing material to be precipitated onto the print receiving material during that interval.

Figure 1:
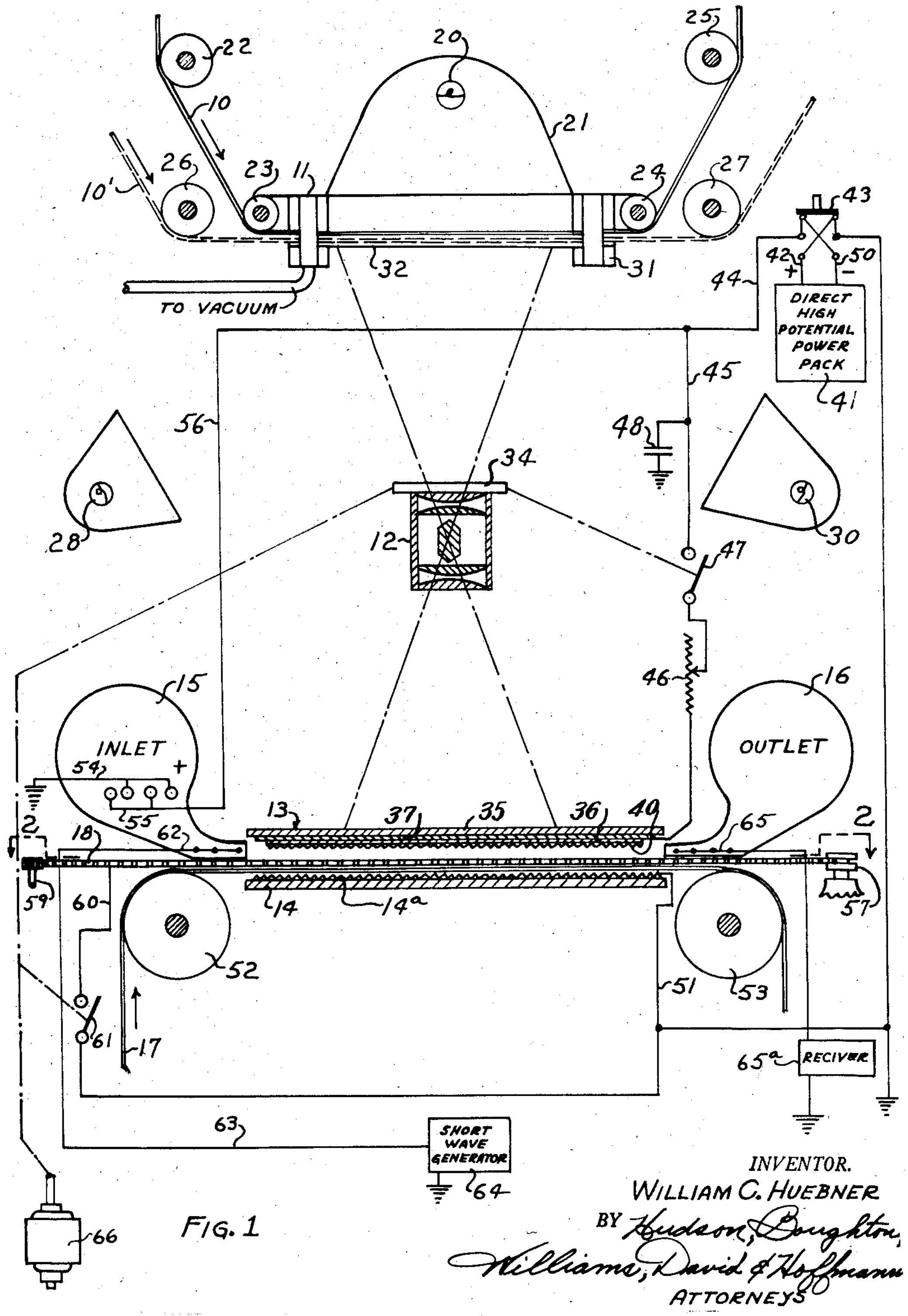

Now referring to Fig. 1 the novel reproducing apparatus will be described wherein the image copy 10 is shown on the copyholder 11 to be illuminated to provide a light image to be projected through the lens system 12. The light image emerging from the lens system 12 is caused to illuminate the light-sensitive target 13 cooperating with a conductive element 14 spaced therefrom and between which an electric field is created. Reproducing material in cloud-like form derived from a pressure conduit 15 may be passed between the elements 13 and 14 to an outlet or suction conduit 16. Print receiving material 17 is positioned between the elements 13 and 14 to receive the reproducing material propelled thereto by the electric field. An image isolator 18 is provided intermediate the print receiving material 17 and the path of flow of the reproducing material.

The image copy 10 is shown as transparent film positioned on the copyholder 11 and is arranged to be intermittently advanced through the copyholder and to be illuminated by a light source 20 positioned on one side of the image copy. The light source 20 may be provided with a light shield 21 to concentrate the light rays transmitted through the image copy 10. The image copy 10 is advanced through the copyholder 11 through the medium of a series of spaced rollers 22, 23, 24 and 25 provided for the copyholder. The image copy 10 may be held in a flat plane through the provision of a conventional vacuum screen or frame 31 having a transparent face 32.

Additional rollers 26 and 27 spaced outwardly from the rollers 23 and 24 may be provided for the copyholder 11 when the desired image copy 10 is opaque copy. The opaque copy is shown in broken lines and is identified by the reference character 10'. The opaque image copy 10' is illuminated through the provision of additional light sources 28 and 30 positioned on the opposite side of the copyholder 11 from the light source 20. The image copy 10' is illuminated by the light sources 28 and 30 and the light image is derived therefrom by reflections from the copy and directed through the lens system 12.

The lens system 12 is supported intermediate the copyholder 11 and the light-sensitive target 13. The lens system 12 is arranged to receive the images derived from the image copy 10 or 10' and to project them onto the adjacent face of the light-sensitive target 13. The size of the light image projected onto the light-sensitive target 13 is correlated to the size of an aperture 33 provided for the image isolator 18, as will be more fully described hereinafter. A shutter 34 may be provided for the lens system 12 and is opened and closed in timed relationship with the advancement of the image copy 10 through the copyholder 11, that is, the shutter will be opened when the image copy 10 is at rest.

The light-sensitive element or target 13 comprises a transparent mounting plate, in this instance shown as a glass plate 35, mounting a light sensitive, photoconductive, material 36 intermediate layers of conductive material 37 and 38. The conductive material 37 is a thin transparent film of silver deposited on the glass plate 35 in intimate contact therewith and having the photoconductive material, in this instance a selenium layer, deposited over the film of silver. The layer of selenium is prepared with a proper proportion of alloys to render it light-sensitive. The photoconductive layer, as is well known, varies in conductivity in response to the presence or absence of light. The change in conductivity takes the form of a change in resistance in elemental or discrete areas in proportion to the light received thereon and can be said to form a pattern of the light. The resistance of the elemental areas decreases in response to light and they revert to their high resistance state upon the removal of the light.

Figure 4:
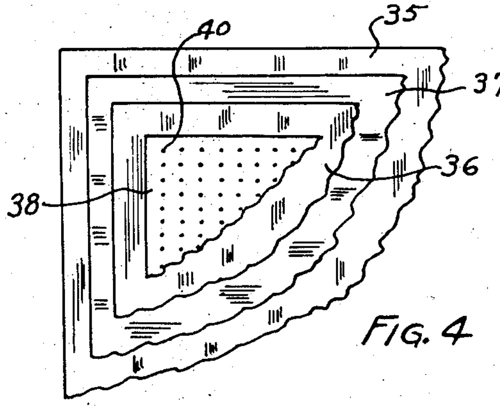
Fig. 4 is a fragmentary bottom plan view of the photoelectric element or target shown in Fig. 3.

The remaining layer of conductive material 38 is also a thin silver film and is deposited in intimate contact with the opposite surface of the light-sensitive layer 36. This outer conductive layer 38 is provided with a plurality of minute relief buttons or projections 40 spaced over the entire outer surface of the layer. These projections 40 are provided on the conductive layer 38 by depositing a thin film of a conductive material, in this instance the silver, over a porous cloth such as silk stretched over the film 38 so as to allow the two films of silver to adhere to one another through the infinitesimal openings in the cloth. These projections 40 are spaced over the layer 38 in rows and columns in a manner similar to that shown in Fig. 4. The projections 40 are provided to establish the lines of force of the electric field between the light-sensitive target 13 and the receiving element 14 in a substantially straight line.

Figure 3:
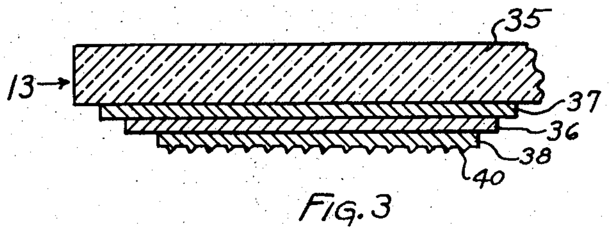
Fig. 3 is a fragmentary sectional view of the photoelectric element or target shown in Fig. 1.

The conductive films 37 and 38 along with the light-sensitive layer 36 are preferably arranged with a thickness so as not to reduce the light transmitting power of the mounting plate 35 less than 50%. The layers 37, 36 and 38 are mounted in intimate contact with one another and also with margins or steps (see Figs. 3 and 4) to allow an electrical connection to be made to the desired layer. Specifically, the layer 37 covers a larger area than the light-sensitive layer 36, which layer is in turn larger in area than the conductive layer 38.

The conductive or receiving element 14 is spaced from the light-sensitive target 13. The conductive element 14 may be a flat electrical member; however, it is shown in this instance with a deposit of a conductive material 14ª fixed to the element 14 and with a plurality of minute projections thereon. The projections for the conductive material 14ª are arranged so that it will face the layer 38 of the target 13 and preferably are similarly disposed and arranged as on the layer 38 and in axial alignment therewith. If the print receiving material 17 is transparent or translucent it may be found desirable to place a light-sensitive layer between the conductive layer 14ª and the conductive element 14 to further influence the electric field in accordance with the light image.

The light-sensitive element 13 and the conductive element 14 are connected in a circuit relationship to a direct current high voltage source identified by the reference character 41. The positive terminal 42 of the high voltage source 41 is connected through a reversing switch 43 to a lead wire 44. The lead wire 44 is directly connected to the conductive layer 37 for the light-sensitive element 13 through a lead wire 45 provided with a variable resistor 46 in series circuit relationship therewith. The voltage of the source 41 is arranged to be sufficient to create a high intensity electric field between the light sensitive element 13 and the conductive element 14 corresponding to the spacing between them and the characteristics of the light-sensitive layer 36.

An on-off switch 47 is also provided in series circuit relationship with the lead wire 45 and is arranged intermediate the resistor 46 and the lead wire 44. A capacitor 48 is also connected to the lead wire 45 intermediate the switch 47 and the lead wire 44 and which capacitor has its opposite terminal connected to ground. The negative terminal 50 for the high voltage source 41 is connected to ground and the electrical circuit through the light-sensitive element 13 and the conductive element 14 is completed by grounding the latter. This grounding connection is shown as the lead wire 51.

The print receiving material 17 is positioned intermediate the light-sensitive element 13 and the conductive element 14 and, in this instance, is shown adjacent the latter element. The print receiving material 17 is intermittently advanced between the elements 13 and 14 through the provision of feeding devices 52 and 53 spaced on opposite ends of the element 14, as shown. The feeding devices 52 and 53 may be of any convenient construction and may be provided with pinwheels cooperating with marginal perforations in the print receiving material 17. It should be readily apparent that the intermittent advancement of the print receiving material 17 is accomplished in timed relationship with the advancement of the image copy 10 through the copyholder 11.

The reproducing material for the novel reproducing apparatus is introduced by means of the pressure conduit 15 spaced outwardly of and between the light-sensitive element 13 and the conductive element 14 adjacent the lateral edges thereof.

The reproducing material introduced between the elements 13 and 14 in this instance is in cloud-like form as hereinabove defined. When the reproducing material is introduced in cloud-like form, as in this embodiment, it may be further characterized as smoke created by the combustion of suitable materials such as powdered dyes, plastic powders or any other such material desired due to its color, intensity or ionization characteristics. The pressure conduit 15 is effective to cause the reproducing material to travel in a path between the elements 13 and 14 to the exhaust outlet 16 spaced on the opposite lateral edges thereof. The reproducing material travels in a path covering the image area of the light-sensitive element so as to come under the influence thereof. The exhaust element 16 is effective to collect or gather the residue of the reproducing material following the projection of the light image onto the light element 13.

It has been found that an improved precipitation of the reproducing material results when it is given a charge to aid its migration or propulsion towards the print receiving material 17. Accordingly charging electrodes 54 and 55 are provided adjacent the outlet passage for the conduit 15. The electrodes 54 are shown as connected to ground while the electrodes 55 are connected to the high voltage source 41 by means of a lead wire 56 which is connected directly to the lead wire 44 for the voltage source.

Figure 2:
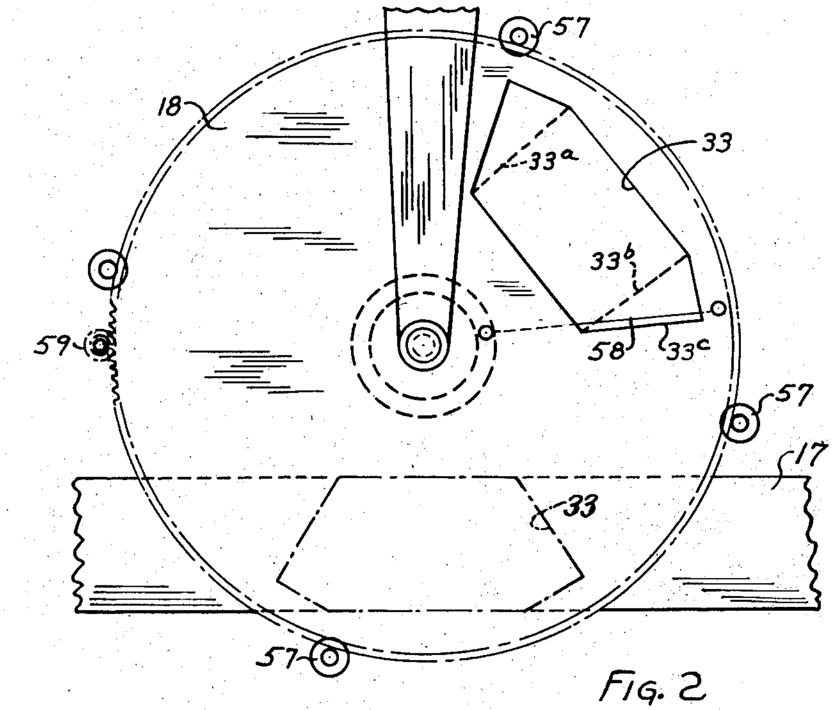
Fig. 2 is a top plan view taken along the line 2—2 of Fig. 1.

The image isolator 18 acts as a shutter to isolate the reproducing material from the print receiving material 17. Accordingly the image isolator 18 is positioned aboved the print receiving material 17 and below the path of the reproducing material. The image isolator 18 is mounted in any suitable manner to continuously rotate in timed relationship with the advancement of the image copy 10 and the print receiving material 17. The image isolator 18 is provided with an aperture 33 arranged thereon to pass the flow of the reproducing material to the print receiving material 17 migrated thereto under the influence of the electric field. The aperture 33 is of an irregular configuration to assure the complete passage of the reproducing material through the image isolator 18 corresponding to the illumination provided by the light image. When the image isolator is employed, the light image projected onto the light-sensitive element 13 is of an area substantially equivalent to the area defined by the dotted lines 33ª and 33ᵇ and the sides of the aperture 33 transverse thereto, as seen in Fig. 2. Accordingly it should be readily apparent that the focal axis of the lens system 12 should be in alignment with the center point of the aforementioned defined area.

The image isolator 18 may be rotated by means of a pinion 59 suitably supported adjacent the toothed peripheral edge of the isolator, in this instance shown on the left hand side thereof. The image isolator 18 is a thin metallic member and is provided with supporting surfaces similar to a plurality of bosses 57 spaced around the peripheral edge thereof.

The image isolator is also arranged to carry a charging wire 58 adjacent the leading edge 33ᶜ of the aperture 33. The charging wire 58 extends across the aperture 33 on the surface adjacent the print receiving material 17 so as to contact and charge the latter as it sweeps over it. The charging wire 58 is connected to the ground terminal of the high voltage source 41 through a lead wire 60 which may be provided with a suitable brush for completing the circuit thereto, as is well-known. The lead wire 60 is also provided with an on-off switch 61 connected in series circuit relationship therewith. The switch 61 is operated in timed relationship with the switch 47.

It is thought that improved precipitation of the reproducing material results when in addition to charging the reproducing material, means for ionizing the same is provided. In this instance the reproducing material is ionized by means of short-wave radiant energy transmitted through the path of the reproducing material between the elements 13 and 14. A transmitting antenna 62 is arranged adjacent the outlet of the pressure conduit 15 and is connected by a suitable transmission line 63 to a short-wave generator 64. The short-wave generator 64 is arranged to provide radiant energy in the region around 200 megacycles and transmits the energy to a receiving antenna 65 positioned adjacent the inlet for the suction conduit 16. The receiving antenna 65 is suitably connected in a well-known manner to a receiver 65ª tuned to the frequency of the generator 64.

With the above described apparatus in mind the steps leading to the final reproductions will become apparent. The reproductions depend upon the timed relationship of the advancement of the image copy 10 with the advancement of the print receiving material 17 which will, in turn, by synchronized or be arranged in a timed relationship with the opening and closing of the switches 47 and 61 along with the shutter 34, when the latter is provided. The switches 47, 61 and the shutter 34 are driven and controlled by a synchronous motor 66 or the like. The operation of the apparatus is arranged so that while the image copy 10 and the print receiving material 17 are at rest the light image is isolated from the print receiving material until the image isolator 18 is moved to a position where the aperture 33 thereof is in alignment with the image focused onto the light-sensitive element 13. Substantially simultaneously with the alignment of the light image with the aperture 33 the high volage potential is applied across the elements 13 and 14 and to the charging wire 58 through the closing of the switches 47 and 61. The combination of the light action and the high voltage stress is effective to cause the reproducing material to be migrated and propelled through the aperture 33 to be deposited on the print receiving material 17 immediately below the aperture 33. The flow of the reproducing material is defined by the variations in the electric field resulting from the resistance changes in the photoconductive layer 36 of the light sensitive element 13 in response to the light image projected onto the light element and in proportion thereto so as to cause the immediate and direct reproduction of the light image onto the print receiving material 17. Upon the continued rotation of the image isolator 18, the print receiving material 17 is cut off from the flow of the reproducing material until the image isolator again rotates into alignment with the light image, at which time the succeeding image on the image copy 10 will have been advanced within the copyholder 11. It should be understood that the reproducing material from pressure conduit 15 is continuously passed between the elements 13 and 14 along with the transmission of the short-wave energy therethrough.

Figure 5:
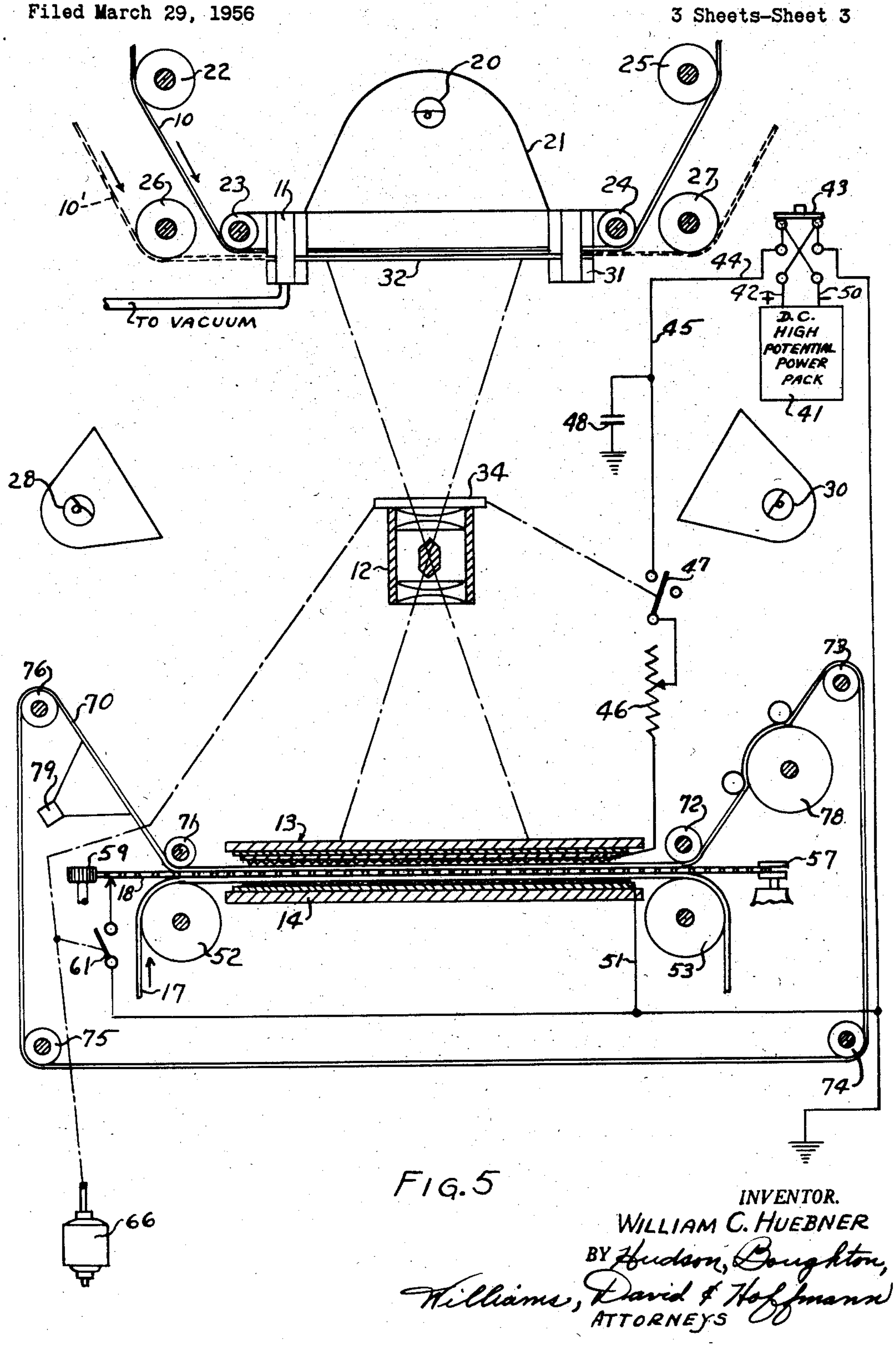
Fig. 5 is a diagrammatic representation illustrating a modified apparatus embodying the invention.

Now referring to Fig. 5, a modified apparatus for reproducing images and embodying the invention will be described. The apparatus shown herein is substantially similar to that previously described except that the reproducing material is introduced in a different and novel manner. In this instance the reproducing material is not introduced in a cloud-like form but is carried between the elements 13 and 14 by an endless belt 70. The belt 70 is preferably a transparent belt and a transparent plastic commercially identified as Saran Wrap is thought to be satisfactory. Saran is a trademark for a thermoplastic resin comprising a copolymer of vinylidene chloride and vinyl chloride. The belt 70 is passed between rollers 71 and 72 spaced at opposite ends of the elements 13 and 14 and above the image isolator 18. The belt 70 passes from the roller 72 in a clockwise direction around the rollers 73, 74, 75 and 76 spaced around the conductive element 14, the latter roller being spaced upwardly from the roller 71. The reproducing material is applied to the belt 70 intermediate the rollers 76 and 71 and is put on the ribbon electronographically or by rollers. Any undesired static charge may be removed from the belt 70 in conventional manner when it is found to be necessary. A coating of reproducing material on the belt 70 is, in this instance, shown as being applied by a spray 79. The reproducing material is then carried by the belt 70 through the elements 13 and 14 around the rollers 72 and into contact with an eraser or cleaning brushes 78 which are provided intermediate the roller 72 and the roller 73 to remove the excess or residue of the reproducing material from the belt so that it may be continuously used.

In this particular embodiment it is thought that the coating of the belt 70 with the reproducing material and passing it through the electric field will cause the reproducing material to be disassociated from the belt and propelled and migrated toward the print receiving material 17 under the influence of the electric field. It is thought that this manner of introducing the reproducing material provides improved reproductions since the background of the image will be mcre nearly controlled.

Although preferred forms of the invention have been described and illustrated herein it will be understood that the invention may be embodied in other forms coming within the scope and meaning of the appended claims.

Having thus described my invention, I claim:

1. In apparatus for reproducing images directly on print receiving material from image copy comprising a light-sensitive target having a light transmitting portion mounting a photoconductive layer, said light-sensitive target being spaced from said image copy and positioned to receive light images therefrom and responsive to the presence or absence of light to provide substantially instantly a change in the electrical resistivity of the photoconductive layer, an electrically conductive receiving element spaced from said light-sensitive target on the side opposite to said image copy and defining an air gap therebetween, a source of relatively high voltage connectable between said target element and said conductive element and effective to provide a high intensity electrical field in said air gap, means for positioning print receiving material in said air gap and between said receiving element and said target, means for isolating and exposing predetermined areas of said print receiving material from said target spaced intermediate the latter and said print receiving material and operative in a predetermined time relation with the creation of the electrical field, means for projecting a light image onto the light-sensitive target on the opposite side thereof from said isolating and exposing means, said light image being of an intensity to pass through the light transmitting portion and photoconductive layer of said target and effective to cause resistive changes in the latter, and means for introducing reproducing material within the air gap intermediate the said target and said isolating means to be acted on by the lines of force of said electrical field and migrated thereby in finely divided form through said isolating means and toward the print receiving material to be intercepted thereby and produces thereon in final finished form a reproduction of the light image.

2. In apparatus for forming directly and substantially instantaneously on print receiving material and in final finished form reproductions of light images from image copy comprising a light-sensitive target spaced from said image copy and having a glass plate mounting a photoconductive layer between electrically conductive layers wherein the outer conductive layer is provided with a surface having a plurality of minute spaced projections, an electrically conductive receiving element spaced from said target on the side opposite to said image copy defining an air gap therebetween and having the surface adjacent said spaced projections provided with a plurality of similar projections and in alignment with the corresponding projections on said target, a source of relatively high voltage connectable between said target and said receiving element and effective to provide a high intensity electrical field in said air gap having the lines of force thereof extending between said aligned conductive projections, means for positioning print receiving material in said air gap and adjacent the projections of said receiving element, means for placing an electrical charge on said positioned print receiving material, means for positioning an image isolator having an aperture therein intermediate said print receiving material and said target and spaced from the latter, means for positioning image copy facing said target and spaced on the opposite side thereof from said image isolator, means for illuminating the image copy during the existence of the electrical field to produce a light image therefrom of a size correlated to the aperture of said image isolator and for projecting the image onto said target and through the glass plate and photoconductive layer, the light image being effective to cause resistive changes in the photoconductive layer and affect the electrical field in conformity to the configuration of said light image, means for passing a ribbon within the air gap intermediate said target and said image isolator, means for coating said ribbon with reproducing material in liquid form on the surface adjacent said image isolator to be acted on by the electrical field and migrated and disassociated therefrom toward the print receiving material through the aperture in the image isolator to be intercepted by the print receiving material to produce thereon in final finished form a reproduction of the light image.

3. The combination as defined in claim 2 including means for cleaning the excessive reproducing material from said ribbon after passing through the electric field and said air gap.

4. The combination as defined in claim 2 wherein said ribbon is a transparent plastic.

5. In apparatus for forming directly and substantially instantaneously on print receiving material and in final finished form reproductions of images from image copy comprising a light-sensitive target spaced from said image copy and having a glass plate mounting a photoconductive layer between electrically conductive layers, an electrically conductive element spaced from said target on the side opposite to said image copy defining an air gap therebetween, a source of relatively high voltage electrically connectable between said target and said conductive element and effective to provide a high intensity electrical field in said air gap, means for positioning print receiving material between said conductive element and said target, means for positioning an image isolator having an aperture therein in said air gap and intermediate said print receiving material and said target, means for positioning image copy facing said target on the opposite side thereof from said image isolator, means for illuminating the image copy during the existence of the electrical field to produce a light image therefrom of a size correlated to the aperture of said image isolator and for projecting the image on said target through the glass plate and the photoconductive layer, the light image being effective to cause resistive changes in the photoconductive layer and affect the electrical field in conformity to the configuration of said light image, means for introducing reproducing material within the air gap intermediate the illuminated target and the image isolator to be acted on by the electrical field and migrated and propelled thereby in finely divided form toward the print receiving material and through the aperture in the image isolator to be intercepted by the print receiving material to produce thereon in final finished form a reproduction of the light image.

6. In apparatus for forming directly and substantially instantaneously on print receiving material and in final finished form reproductions of images from image copy as defined in claim 5 and wherein the photoconductive layer is a selenium layer.

7. In apparatus for forming directly and substantially instantaneously on print receiving material and in final finished form reproduction of images from image copy as defined in claim 5 including means for ionizing the reproducing material prior to its introduction into the air gap intermediate the illuminated target and the image isolator.

8. In apparatus for forming directly and substantially instantaneously on print receiving material and in final finished form reproductions of images from image copy as defined in claim 7 wherein the ionizing means comprises means for transmitting short-wave radiant energy through the air gap traversing the path of the reproducing material.

9. In apparatus for reproducing images directly on print receiving material from image copy comprising an image copy support, a print receiving material support spaced from said copy support, a light sensitive target including an imperforate transparent plate having one side facing toward said image copy support and mounting on its other side an electrically conductive layer, a photoconductive layer on said electrically conductive layer and a second electrically conductive layer on said photoconductive layer, said target being located intermediate said supports, an electrically conductive element spaced from said light sensitive target and defining an air gap therebetween, means for projecting light rays correlated to the image copy upon said target to cause substantially instantly a change in the electrical conductivity of said photoconductive layer, means for creating an electric field between said light sensitive target and said conductive element extending across said air gap and of an intensity depending upon the change in conductivity of said photoconductive element, means for positioning print receiving material upon said material support and into said electric field in said air gap, means for introducing reproducing material into said air gap intermediate the positioned receiving material and said light-sensitive target to be acted upon by said electric field and migrated thereby in finely divided form toward said positioned print receiving material, means for establishing the projection of said light rays upon said target in a predetermined timed relationship with the positioning of said print receiving material in said air gap and the creation of said electric field, and means in said air gap to effect the ionization of said finely divided reproducing material and further the migration of the latter to said positioned print receiving material.

10. The combination as defined in claim 9 and wherein the means for effecting the ionization of the reproducing material includes means for transmitting short-wave radiations into the air gap and through a path traversed by said reproducing material.

11. In apparatus for reproducing images directly on print receiving material from image copy comprising an image copy support, a print receiving material support spaced from said copy support, a light sensitive target including a photoconductive element located intermediate said supports, an electrically conductive element spaced from said light sensitive target defining an air gap therebetween, an image isolator having at least one aperture spaced intermediate said target and print receiving material support and extending into said air gap, means for projecting light rays correlated to the image copy upon the said target to cause substantially instantly a change in the electrical conductivity of said photoconductive element, means for creating an electric field between said light sensitive target and said conductive element extending across said air gap and of a variable intensity depending upon the change in conductivity of said photoconductive element, means for positioning print receiving material upon said material support into said electrical field in said air gap intermediate said conductive element and said image isolator, means for introducing reproducing material in cloud-like form into said air gap intermediate said light sensitive target and said image isolator to be acted upon by said electric field and migrated thereby through the aperture in said image isolator and toward said positioned print receiving material, means for establishing the projection of said light rays upon said target in a predetermined timed relationship with the positioning of said print receiving material and the creation of said electric field, and means in said air gap to effect the ionization of said cloud-like reproducing material and further the migration of the latter to said positioned print receiving material.

12. In apparatus for reproducing images directly on print receiving material from image copy as defined in claim 11 and including means for rotating the image isolator in a timed relationship with the positioning of the print receiving material and the creation of said electric field to bring the aperture in said image isolator into position to permit the migration of the cloud-like reproducing material therethrough and onto said positioned print receiving material.

13. In apparatus for reproducing images directly on print receiving material from image copy comprising an image copy support, a print receiving material support spaced from said copy support, a light sensitive target located intermediate said supports including a photoconductive layer between electrically conductive layers and having a surface opposite to said image copy support provided with a plurality of minute electrically conductive projections, an electrically conductive element spaced from said light sensitive target defining an air gap therebetween with the surface thereof adjacent said conductive projections being provided with a plurality of substantially similar electrically conductive projections in axial alignment therewith, means for projecting light rays correlated to the image copy upon said target to cause substantially instantly a change in the electrical conductivity of said photoconductive element, means for creating an electric field between said target and said conductive element extending across said air gap and having the lines of force thereof extending between said aligned conductive projections and of an intensity depending upon the change in conductivity of said photoconductive element, means for positioning print receiving material upon said material support and into said electric field and said air gap, means for introducing reproducing material in cloud-like form into said air gap intermediate the positioned receiving material and said light sensitive target to be acted upon by said electric field and migrated thereby toward said positioned print receiving material, means for establishing the projection of said light rays upon said light sensitive target in a predetermined timed relation with the positioning of said print receiving material and the creation of said electric field, and means in said air gap to effect the ionization of said cloud-like reproducing material and further the migration of the latter to said positioned print receiving material.

14. In apparatus for reproducing images directly on print receiving material from image copy comprising an image copy support, a print receiving material support spaced from said copy support, a light sensitive target including a photoconductive element and located intermediate said supports and having a surface provided with a plurality of minute electrically conductive projections, an electrically conductive element spaced from said light sensitive target defining an air gap therebetween with the surface thereof adjacent said conductive projections being provided with a plurality of substantially similar electrically conductive projections in axial alignment therewith, means for projecting light rays correlated to the image copy upon said target to cause substantially instantly a change in the electrical conductivity of said photoconductive element, means for creating an electric field between said target and said conductive element extending across said air gap and having the lines of force thereof extending between said aligned conductive projections and of an intensity depending upon the change in conductivity of said photoconductive element, means for positioning print receiving material on said material support and into said electric field in said air gap, means for passing a ribbon through said air gap intermediate said light sensitive target and positioned print receiving material, means for coating said ribbon with reproducing material in a liquid form to be acted upon by said electric field and disassociated thereby from said ribbon and migrated toward said positioned print receiving material, and means for establishing the projection of said light rays upon said light sensitive target in a predetermined timed relationship with the positioning of said print receiving material and the creation of said electric field.

References Cited in the file of this patent

UNITED STATES PATENTS

| | | |
|---|---|---|
| 1,305,104 | Hewitt | May 27, 1919 |
| 2,614,901 | Jacob | Oct. 21, 1952 |
| 2,691,345 | Huebner | Oct. 12, 1954 |
| 2,676,100 | Huebner | Apr. 20, 1954 |
| 2,703,363 | Rines et al. | Mar. 1, 1955 |
| 2,710,814 | Mears | June 14, 1955 |
| 2,711,481 | Phillips | June 21, 1955 |
| 2,716,826 | Huebner | Sept. 6, 1955 |
| 2,752,833 | Jacob | July 3, 1956 |
| 2,758,525 | Moncrieff-Yeates | Aug. 14, 1956 |
| 2,771,336 | MacGriff | Nov. 20, 1956 |